(12) United States Patent
Sun et al.

(10) Patent No.: US 11,407,431 B2
(45) Date of Patent: Aug. 9, 2022

(54) SYSTEM AND METHOD FOR OBJECT TRAJECTORY PREDICTION IN AN AUTONOMOUS SCENARIO

(71) Applicant: Samsung Electronics Co., Ltd., Suwon-si (KR)

(72) Inventors: Lin Sun, Mountain View, CA (US); Schuyler Cullen, Santa Clara, CA (US); Farshid Moussavi, Oakland, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 16/742,702

(22) Filed: Jan. 14, 2020

(65) Prior Publication Data

US 2021/0155266 A1 May 27, 2021

Related U.S. Application Data (60) Provisional application No. 62/939,536, filed on Nov. 22, 2019.

(51) Int. Cl.
*B60W 60/00* (2020.01)
*G05D 1/02* (2020.01)
*G05D 1/00* (2006.01)
*G01S 17/931* (2020.01)
*G06N 3/04* (2006.01)
(Continued)

(52) U.S. Cl.
CPC ......... *B60W 60/0027* (2020.02); *G01S 17/89* (2013.01); *G01S 17/931* (2020.01); *G05D 1/0088* (2013.01); *G05D 1/0214* (2013.01); *G05D 1/0221* (2013.01); *G05D 1/0238* (2013.01); *G06N 3/04* (2013.01);
(Continued)

(58) Field of Classification Search
CPC ......... B60W 60/0027; B60W 2420/42; B60W 2420/52; G01S 17/89; G01S 17/58; G05D 1/0088; G05D 1/0238; G06N 3/0454
See application file for complete search history.

(56) References Cited

U.S. PATENT DOCUMENTS 9,202,144 B2    12/2015  Wang et al.
9,336,436 B1 *   5/2016  Dowdall ........... B60W 60/0027
(Continued)

OTHER PUBLICATIONS

Modeling Individual's Movement Patterns to infer Next Location from Sparse Trajectory Traces; Ghosh et al.; 2018 IEEE Intl. Conf. on Systems, Man and Cybernetics; pp. 693-698 (Year: 2018).*
(Continued)

*Primary Examiner* — Michael J Zanelli
(74) *Attorney, Agent, or Firm* — Lewis Roca Rothgerber Christie LLP (57) ABSTRACT

An object trajectory prediction system of a vehicle includes: one or more sensors to generate sensory data corresponding to one or more objects within a range of the vehicle; one or more processors; and memory connected to the one or more processors and having instructions that, when executed by the one or more processors, cause the one or more processors to: identify a first person of interest (POI) from the sensory data; estimate a 3-dimensional (3D) pose of the first POI from the sensory data; calculate a trajectory of the first POI according to at least the 3D pose of the first POI; and determine a navigational path of the vehicle according to the trajectory of the first POI.

16 Claims, 6 Drawing Sheets

(51) Int. Cl.
*G06N 3/08* (2006.01)
*G01S 17/89* (2020.01)

(52) U.S. Cl.
CPC ......... *G06N 3/08* (2013.01); *B60W 2554/404* (2020.02); *G05D 2201/0213* (2013.01)

(56) References Cited

U.S. PATENT DOCUMENTS

| | | | |
|---|---|---|---|
| 9,986,154 | B2 | 5/2018 | Chen et al. |
| 10,970,518 | B1* | 4/2021 | Zhou .................... G06K 9/6257 |
| 2014/0363048 | A1 | 12/2014 | Vrcelj et al. |
| 2015/0332464 | A1 | 11/2015 | O'Keefe et al. |
| 2016/0140436 | A1 | 5/2016 | Yin et al. |
| 2016/0300485 | A1* | 10/2016 | Ayvaci .................... G06V 20/58 |
| 2017/0132758 | A1 | 5/2017 | Paluri et al. |
| 2018/0108149 | A1 | 4/2018 | Levinshtein |
| 2018/0204338 | A1 | 7/2018 | Narang et al. |
| 2019/0147220 | A1 | 5/2019 | McCormac et al. |
| 2019/0188541 | A1* | 6/2019 | Wang .................... G06N 3/0454 |
| 2019/0317219 | A1* | 10/2019 | Smith .................... G05D 1/0088 |
| 2020/0004259 | A1* | 1/2020 | Gulino .................... G05D 1/0219 |
| 2020/0167954 | A1* | 5/2020 | Wallin .................... G06V 10/454 |
| 2020/0200905 | A1* | 6/2020 | Lee .................... G01S 17/89 |
| 2020/0272148 | A1* | 8/2020 | Karasev .................... G06N 3/08 |
| 2020/0339116 | A1* | 10/2020 | Xu .................... B60W 30/0956 |

OTHER PUBLICATIONS

Jogendra Nath Kundu et al., "Unsupervised Feature Learning of Human Actions as Trajectories in Pose Embedding Manifold", 2019 IEEE Winter Conference on Applications of Computer Vision pp. 1459-1467.

Matthew Loper, et al. "SMP, A Skinned Multi-Person Linear Model" https://smpl.is.tue.mpg.de/, 5 pgs.

Alexandre Alahi et al., "Social LSTM: Human Trajectory Prediction in Crowded Spaces", Stanford University, Palo Alto, CA, 11 pgs.

* cited by examiner

SYSTEM AND METHOD FOR OBJECT TRAJECTORY PREDICTION IN AN AUTONOMOUS SCENARIO

CROSS-REFERENCE TO RELATED APPLICATION(S)

This application claims priority to and the benefit of U.S. Provisional Application No. 62/939,536, filed on Nov. 22, 2019, entitled "SYSTEM AND METHOD FOR PEDESTRIAN TRAJECTORY PREDICTION VIA HUMAN 3D POSE ESTIMATION," the entire content of which is incorporated herein by reference in its entirety.

FIELD

Aspects of one or more example embodiments of the present disclosure relate to autonomous scenarios (e.g., autonomous vehicles, autonomous environments, and/or the like), and more particularly, to an object trajectory prediction system in an autonomous scenario (e.g., an autonomous vehicle, an autonomous environment, and/or the like), and a method including the same.

BACKGROUND

An autonomous vehicle, for example, such as a self-driving car, is a vehicle that is capable of perceiving its surroundings to safely traverse an environment with minimal or no human input. The autonomous vehicle generally includes a variety of sensors to sense its environment, and sensory information of the sensors is analyzed to identify an appropriate navigational path of the autonomous vehicle that avoids obstacles. Such obstacles include, for example, static obstacles or stationary obstacles (e.g., road ways, road signages, walkways, walkway signages, light posts, and/or the like) and dynamic obstacles or moving obstacles (e.g., pedestrians, animals, other vehicles, and/or the like). From among these obstacles, trajectory prediction for the dynamic obstacles is an important consideration to ensure safe maneuvering of the autonomous vehicle around such obstacles and their predicted path of movement.

Generally, in order to predict the trajectory of a dynamic obstacle, historic temporal data associated with one or more previous positions of the dynamic obstacle is used to estimate a potential position of the dynamic obstacle at a future point in time. However, directly regressing the trajectory of the dynamic obstacle (e.g., without considering the environment and the intrinsic properties associated with the dynamic obstacle) may not be sufficient to ensure safe navigational path planning. For example, when traversing a crowded environment, pedestrians generally comply with a number of social conventions and common-sense rules when deciding which path to take, rather than merely taking a path based solely on previous (or past) positions. Thus, relying only on the historic temporal data of the dynamic obstacles to predict the trajectories thereof may not be sufficient. Accordingly, an improved system and method for predicting the trajectory of a dynamic obstacle, such as a pedestrian, for example, may be desired.

The above information disclosed in this Background section is for enhancement of understanding of the background of the present disclosure, and therefore, it may contain information that does not constitute prior art.

SUMMARY

According to one or more embodiments of the present disclosure, an object trajectory prediction system of a vehicle includes: one or more sensors configured to generate sensory data corresponding to one or more objects within a range of the vehicle; one or more processors; and memory coupled to the one or more processors and having instructions that, when executed by the one or more processors, cause the one or more processors to: identify a first person of interest (POI) from the sensory data; estimate a 3-dimensional (3D) pose of the first POI from the sensory data; calculate a trajectory of the first POI according to at least the 3D pose of the first POI; and determine a navigational path of the vehicle according to the trajectory of the first POI.

In an embodiment, the one or more sensors may include: one or more cameras to generate 2-dimensional (2D) image data associated with the first POI; and one or more LIDARs to generate 3D point cloud data associated with the first POI.

In an embodiment, to estimate the 3D pose of the first POI, the instructions may further cause the one or more processors to: perform a 3D convolution on the 3D point cloud data to generate a sparse shape corresponding to the first POI; generate a voxelized model according to the sparse shape; perform a 2D convolution on the 2D image data to identify one or more features of the first POI; append the one or more features of the first POI to coordinates of the voxelized model to generate a voxelized 3D coordinate model; identify one or more body parameters of the first POI according to the voxelixed 3D coordinate model; and regress the body parameters to determine the 3D pose of the first POI.

In an embodiment, to calculate the trajectory of the first POI, the instructions may further cause the one or more processors to: identify an activity of the first POI according to the identified features of the first POI; and determine a potential effect of the activity on the trajectory of the first POI.

In an embodiment, the instructions may further cause the one or more processors to: generate historic temporal data associated with the first POI, the historic temporal data including time-correlated position information corresponding to a current location of the first POI; and generate a local map corresponding to obstacles surrounding the current location of the first POI.

In an embodiment, to calculate the trajectory of the first POI, the instructions may further cause the one or more processors to: determine the current location and a heading direction of the first POI from the historic temporal data; identify one or more obstacles within a spatial proximity relative to the current location and along the heading direction; and identify one or more potential paths of the first POI according to the current location of the first POI, the heading direction of the first POI, and the one or more obstacles.

In an embodiment, to calculate the trajectory of the first POI, the instructions may further cause the one or more processors to: identify an orientation of the first POI's face according to the 3D pose of the first POI; and select a trajectory path from among the one or more potential paths according to the orientation of the first POI's face.

In an embodiment, the instructions may further cause the one or more processors to: identify a second POI from the sensory data, the second POI being within a spatial proximity relative to the first POI; and generate historic temporal data associated with the second POI, the historic temporal data associated with the second POI including time-correlated position information corresponding to a current location of the second POI.

In an embodiment, to calculate the trajectory of the first POI, the instructions may further cause the one or more processors to: determine the current location and a heading direction of the first POI from the historic temporal data associated with the first POI; determine the current location and a heading direction of the second POI from the historic temporal data associated with the second POI; and identify one or more potential paths of the first POI according to the current location of the first POI, the heading direction of the first POI, the current location of the second POI, and the heading direction of the second POI.

In an embodiment, to calculate the trajectory of the first POI, the instructions may further cause the one or more processors to: identify an intent to adjust a current trajectory of the first POI relative to the current location and/or the current heading direction of the second POI according to the 3D pose of the first POI; and select a trajectory path from among the one or more potential paths according to the intent.

According to one or more embodiments of the present disclosure, a method for predicting the trajectory of an object, includes: receiving, by one or more processors, sensory data from one or more sensors associated with a vehicle, the sensory data corresponding to one or more objects within a range of the vehicle; identifying, by the one or more processors, a first person of interest (POI) from the sensory data; estimating, by the one or more processors, a 3-dimensional (3D) pose of the first POI from the sensory data; calculating, by the one or more processors, a trajectory of the first POI according to at least the 3D pose of the first POI; and determining, by the one or more processors, a navigational path of the vehicle according to the trajectory of the first POI.

In an embodiment, the one or more sensors may include: one or more cameras to generate 2-dimensional (2D) image data associated with the first POI; and one or more LIDARs to generate 3D point cloud data associated with the first POI.

In an embodiment, the estimating of the 3D pose of the first POI may include: performing, by the one or more processors using a first convolutional neural network (CNN), a 3D convolution on the 3D point cloud data to generate a sparse shape corresponding to the first POI; generating, by the one or more processors, a voxelized model according to the sparse shape; performing, by the one or more processors using a second CNN, a 2D convolution on the 2D image data to identify one or more features of the first POI; appending, by the one or more processors, the one or more features of the first POI to coordinates of the voxelized model to generate a voxelized 3D coordinate model; identifying, by the one or more processors, one or more body parameters of the first POI according to the voxelixed 3D coordinate model; and regressing, by the one or more processors, the body parameters to determine the 3D pose of the first POI.

In an embodiment, the calculating of the trajectory of the first POI may include: identifying, by the one or more processors, an activity of the first POI according to the identified features of the first POI; and determining, by the one or more processors, a potential effect of the activity on the trajectory of the first POI.

In an embodiment, the method may further include: generating, by the one or more processors, historic temporal data associated with the first POI, the historic temporal data including time-correlated position information corresponding to a current location of the first POI; and generating, by the one or more processors, a local map corresponding to obstacles surrounding the current location of the first POI.

In an embodiment, the calculating of the trajectory of the first POI may include: determining, by the one or more processors, the current location and a heading direction of the first POI from the historic temporal data; identifying, by the one or more processors, one or more obstacles within a spatial proximity relative to the current location and along the heading direction; and identifying, by the one or more processors, one or more potential paths of the first POI according to the current location of the first POI, the heading direction of the first POI, and the one or more obstacles.

In an embodiment, the calculating of the trajectory of the first POI may include: identifying, by the one or more processors, an orientation of the first POI's face according to the 3D pose of the first POI; and selecting, by the one or more processors, a trajectory path from among the one or more potential paths according to the orientation of the first POI's face.

In an embodiment, the method may further include: identifying, by the one or more processors, a second POI from the sensory data, the second POI being within a spatial proximity relative to the first POI; and generating, by the one or more processors, historic temporal data associated with the second POI, the historic temporal data associated with the second POI including time-correlated position information corresponding to a current location of the second POI.

In an embodiment, the calculating of the trajectory of the first POI may include: determining, by the one or more processors, the current location and a heading direction of the first POI from the historic temporal data associated with the first POI; determining, by the one or more processors, the current location and a heading direction of the second POI from the historic temporal data associated with the second POI; and identifying, by the one or more processors, one or more potential paths of the first POI according to the current location of the first POI, the heading direction of the first POI, the current location of the second POI, and the heading direction of the second POI.

In an embodiment, the calculating of the trajectory of the first POI may include: identifying, by the one or more processors, an intent to adjust a current trajectory of the first POI relative to the current location and/or the current heading direction of the second POI according to the 3D pose of the first POI; and selecting, by the one or more processors, a trajectory path from among the one or more potential paths according to the intent.

According to one or more embodiments of the present disclosure, a computer-readable storage medium storing instructions thereon is provided. The instructions, when executed by a processor, cause the processor to perform a method including: identifying a first person of interest (POI) from sensory data; estimating a 3-dimensional (3D) pose of the first POI from the sensory data; calculating a trajectory of the first POI according to at least the 3D pose of the first POI; and determining a navigational path of a vehicle according to the trajectory of the first POI.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Hereinafter, example embodiments will be described in more detail with reference to the accompanying drawings, in which like reference numbers refer to like elements throughout.

One or more example embodiments of the present disclosure are directed to an improved trajectory tracking system for an autonomous vehicle, and a method for improved trajectory tracking for the autonomous vehicle. One or more example embodiments of the present disclosure are directed to predicting the trajectory of a dynamic or moving object according to one or more insights learned from a 3D pose of the dynamic or moving object. However, the present disclosure is not limited to the above-described aspects and features, and the above and other aspects and features of the present disclosure will become more apparent to those skilled in the art from the following detailed description of the example embodiments with reference to the accompanying drawings.

Figure 1:
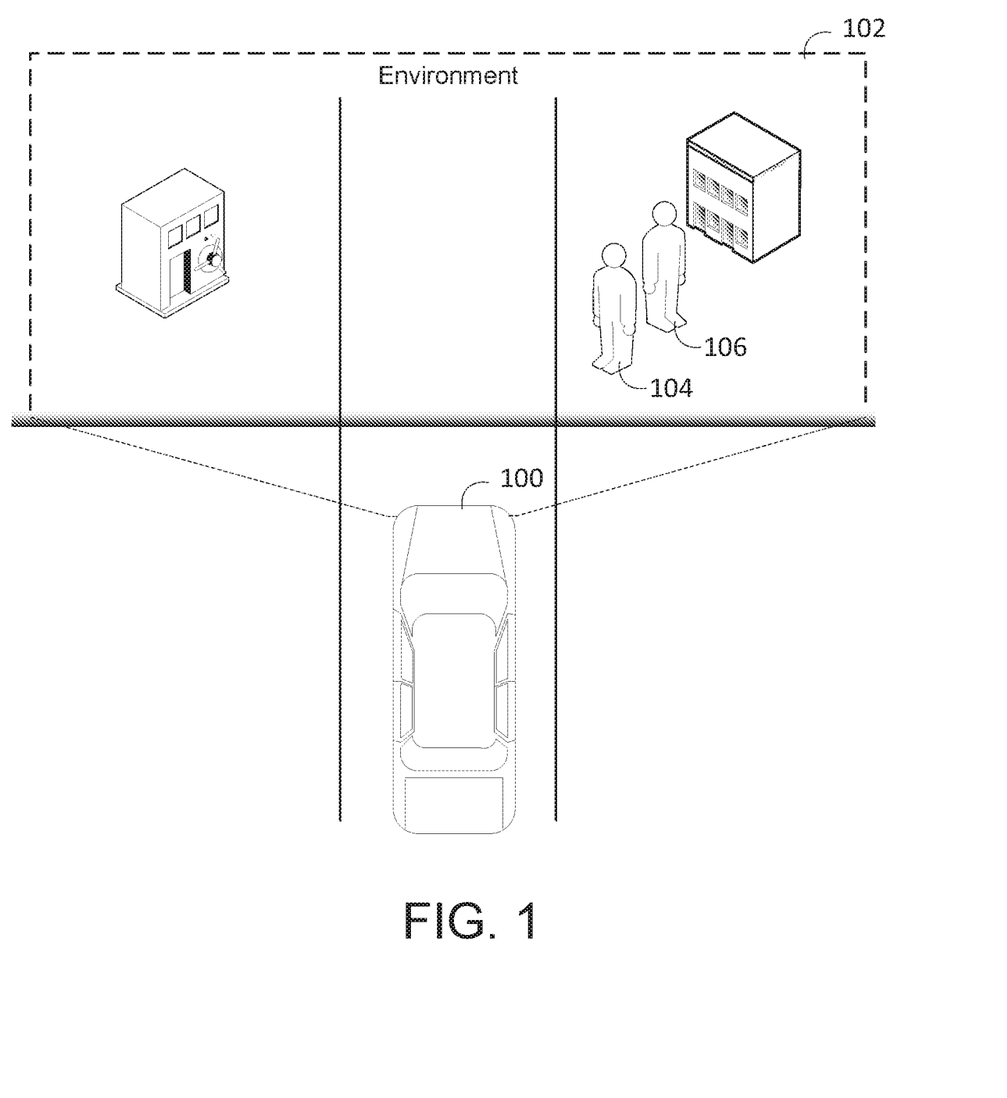
FIG. 1 is a diagram illustrating an example of an autonomous vehicle navigating an environment, according to an example embodiment.

FIG. 1 is a diagram illustrating an example of an autonomous vehicle navigating an environment, according to an example embodiment.

Referring to FIG. 1, an autonomous vehicle (also referred to simply as the "vehicle") 100 is shown navigating along a roadway. The vehicle 100 includes a plurality of sensors to detect its surroundings within an environment 102. For example, the plurality of sensors may detect a plurality of objects within the environment 102, such as a first person of interest (POI) 104 and a second POI 106. The vehicle 100 may analyze sensory information from the plurality of sensors to identify a suitable navigational path along which to maneuver the vehicle 100. For example, the vehicle 100 may estimate a potential trajectory (e.g., a potential path and/or future location) of the first POI 104 and/or the second POI 106 to generate a suitable navigational path that avoids colliding with the first POI 104 and/or the second POI 106 along the potential trajectory. While FIG. 1 shows an example of a self-driving car as the vehicle 100, the present disclosure is not limited thereto, and in other embodiments, the autonomous vehicle may be any suitable kind of self-maneuvering vehicle, for example, such as a self-maneuvering truck, a self-maneuvering tractor, a self-maneuvering tractor-trailer, a self-maneuvering boat, a self-maneuvering ship, a self-maneuvering airplane, a self-maneuvering helicopter, a self-maneuvering motorcycle, and/or the like.

Figure 2:
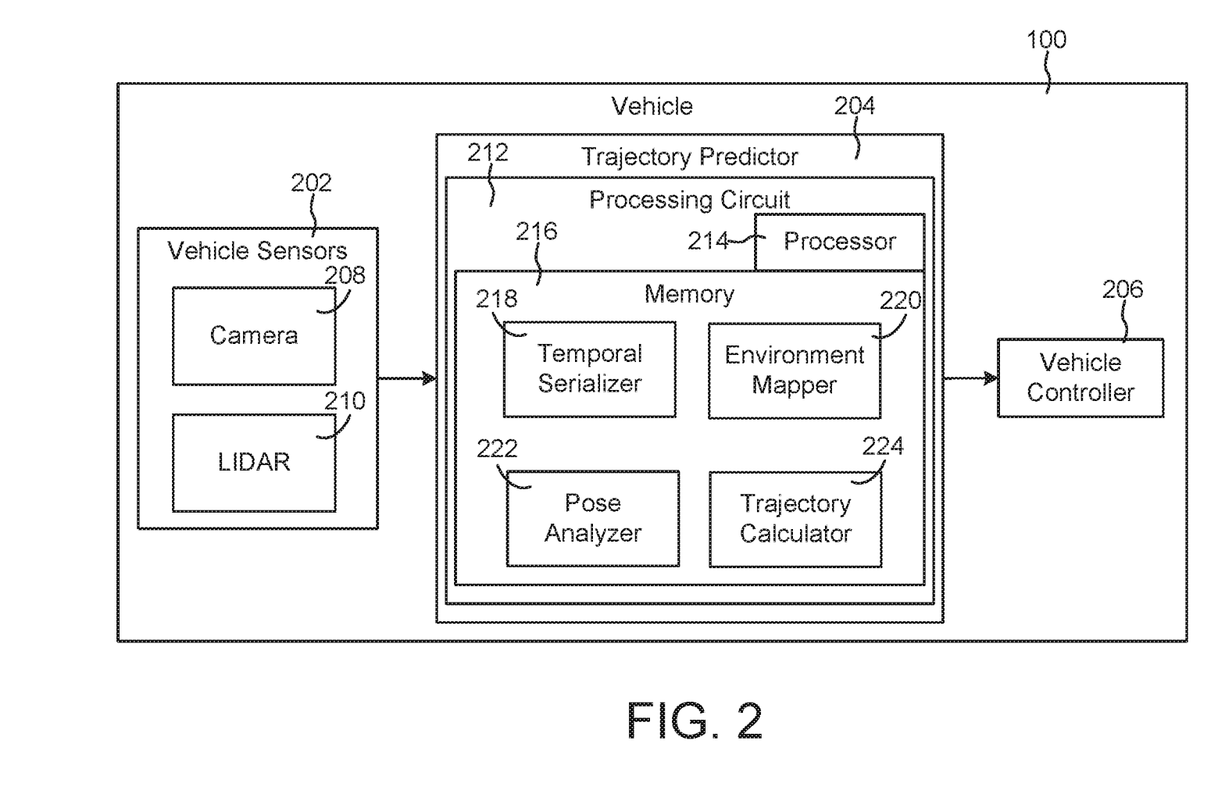
FIG. 2 is a block diagram illustrating an autonomous vehicle, according to an example embodiment.

FIG. 2 is a block diagram illustrating an autonomous vehicle, according to an example embodiment. Referring to FIG. 2, in some embodiments, the vehicle 100 shown in FIG. 1 may include a plurality of vehicle sensors (also referred to hereinafter simply as sensors or vehicle sensors) 202, a trajectory predictor 204, and a vehicle controller 206. The sensors 202 may include any suitable number of one or more kinds of sensors for detecting obstacles (or objects) within a range of the vehicle 100 (e.g., or within a navigational path of the vehicle 100). For example, in various embodiments, the sensors 202 may include one or more of a radar, LIDAR, sonar, Global Positioning System (GPS), odometry, inertial measurement units, cameras, and/or the like. In some embodiments, at least one the sensors 202 may provide a 2-dimensional (2D) representation (e.g., a 2D image) of the obstacle and at least another one of the sensors 202 may provide a 3-dimensional (3D) representation (e.g., a point cloud or a 3D model) of the obstacle. For example, the sensors 202 may include at least one camera (also referred to simply as the "camera") 208 to provide the 2D representation of the obstacle, and at least one LIDAR (also referred to simply as the "LIDAR") 210 to provide the 3D representation of the obstacle, but the present disclosure is not limited thereto. In some embodiments, each of the 2D representation and the 3D representation of the obstacle may be provided to the trajectory predictor 204.

The trajectory predictor 204 may estimate a potential trajectory of the obstacle based on the 2D representation and the 3D representation of the obstacle. In some embodiments, the trajectory predictor 204 may analyze the 2D and 3D representations of the obstacle to determine one or more intrinsic properties (e.g., one or more pose attributes) of the obstacle, for example, such as a 3D pose, an activity, an intention, and/or the like. In some embodiments, the trajectory predictor 204 may estimate the potential trajectory of the obstacle according to a position of the obstacle, environmental surroundings of the obstacle, and one or more of the intrinsic properties of the obstacle. The potential trajectory of the obstacle may then be used to identify a suitable navigational path (e.g., by the trajectory predictor 204 and/or the vehicle controller 206) of the vehicle 100 that avoids a collision or potential collision with the obstacle. For example, in some embodiments, the trajectory predictor 204 may provide the estimated trajectory of the obstacle (or a suitable navigational path identified based on the estimated trajectory of the obstacle) to the vehicle controller 206, and the vehicle controller 206 may control the vehicle 100 to automatically maneuver along a suitable navigational path that is identified based on the estimated trajectory of the obstacle. In this respect, the vehicle controller 206 may include any suitable controllers, drivers, motors, actuators, circuits, processors, and/or the like to automatically control the movement of the vehicle 100 along the identified suitable navigational path.

In more detail, as shown in FIG. 2, the trajectory predictor 204 may include a processing circuit 212 including one or more processors (also referred to simply as the "processor") 214 and memory 216. In some embodiments, the processing circuit 212 may be communicably connected to one or more interfaces (e.g., a sensor interface, a controller interface, a wireless communications interface, and/or the like), such that the processing circuit 212 and the various components thereof can send and receive data with other components of the vehicle 100 and/or external systems (e.g., the vehicle sensors 202, the vehicle controller 206, a Cloud computing device, other vehicles within a spatial proximity, and/or the like) via the interfaces. In various embodiments, the processor 214 may include a general-purpose processor, an Application Specific Integrated Circuit (ASIC), one or more Field Programmable Gate Arrays (FPGAs), a Digital Signal Processor (DSP), any other suitable electronic processing components, or combinations thereof. In some embodiments, the processor 214 may include a group of processing components that are distributed over various geographical locations or housed in a single location or device (e.g., the vehicle 100). For example, in some embodiments, the processor 214 may include a processor (or a processing component) of the vehicle 100, and a processor (or a processing component) of a Cloud computing device (e.g., a Cloud service or a Cloud server). In another example, in some embodiments, the processor 214 may include a processor (or a processing component) of the vehicle 100, and one or more processors (or processing components) of one or more other vehicles (e.g., within a spatial proximity of the vehicle 100) to communicate data amongst each other.

The memory 216 may include tangible, non-transient, volatile memory or non-volatile memory, for example, such as Random Access Memory (RAM), Read-Only Memory (ROM), Non-volatile RAM (NVRAM), Flash Memory, hard disk storage, any other suitable electronic storage medium, or combinations thereof. In some embodiments, the memory 216 is communicably connected to processor 214 via processing circuit 212, and includes computer code for executing (e.g., by processing circuit 212 and/or processor 214) one or more processes described herein. For example, the memory 216 stores instructions (e.g., data, computer code, and/or programming logic) that, when executed by the processor 214, controls the operations of the trajectory predictor 204. Accordingly, the memory includes database components, object code components, script components, and/or any other suitable kinds of information structures for supporting the various activities and information structures described herein.

As shown in FIG. 2, in some embodiments, the memory 216 includes a temporal serializer 218, an environment mapper 220, a pose analyzer 222, and a trajectory calculator 224. In brief overview, in some embodiments, the temporal serializer 318 determines a current position, heading direction, and/or speed of one or more dynamic obstacles (referred to hereinafter as an object of interest or a person of interest) that are within range (e.g., a desired range, a predetermined range, and/or a threshold range) of the vehicle sensors 202. In some embodiments, the environment mapper 220 maps a local map of the environment and the static obstacles (e.g., buildings, roadways, walkways, traffic signages, and/or the like) within a spatial proximity of the dynamic obstacles. In some embodiments, the pose analyzer 222 identifies one or more intrinsic properties (e.g., a pose, an activity, and/or an intent) of the dynamic obstacles that may affect a potential trajectory of the dynamic obstacles. In some embodiments, the trajectory calculator 224 calculates (or estimates) the potential trajectory of the dynamic obstacles based on the current position, heading direction, and/or speed of the dynamic obstacles, the local environment (and objects) surrounding the dynamic obstacles, and the one or more intrinsic properties of the dynamic obstacles.

In more detail, in some embodiments, the temporal serializer 218 may generate historic temporal data associated with a position of one or more obstacles relative to a navigational path of the vehicle 100. The historic temporal data may refer to dynamic time-correlated position information of an object of interest (OOI) and may include, for example, a plurality of time-correlated data points (e.g., a timeseries of datapoints), each of the time-correlated data points including a relative position (e.g., coordinate data) of the OOI at a particular point in time. For example, in some embodiments, the temporal serializer 218 may track the OOI in real-time (or near real-time) using one or more of the vehicle sensors 202, and may generate the historic temporal data of the OOI in real-time or near real-time based on the tracking. In some embodiments, the historic temporal data may be stored in a buffer associated with the trajectory predictor 204 or other suitable storage device such that the historic temporal data may be retrieved as needed or desired.

In some embodiments, the temporal serializer 218 may calculate a current position (e.g., a current location), a movement direction, speed, and/or the like of the OOI according to the historic temporal data.

In some embodiments, the environment mapper 220 may identify a mapping of a surrounding area (or a vicinity) of a current position of the OOI. For example, in some embodiments, the environment mapper 220 may obtain localization information and mapping information associated with the current position of the OOI. The localization information may indicate, for example, a current geographical location of the OOI. For example, the localization information may be obtained from GPS data, high-definition GPS data, any suitable localization and/or mapping algorithms, for example, such as a Simultaneous Localization and Mapping (SLAM) algorithm, and/or the like. The mapping information may include, for example, a static map associated with the current geographical location of the OOI. The mapping information may identify various static or stationary objects that are located within the surroundings (or vicinity) of the current geographical location of the OOI, for example, such as buildings, walkways, traffic signals, and/or the like. For example, the mapping information may be obtained from high-definition GPS data, high-definition map information provided by a $3^{rd}$ party provider, and/or the like. The environment mapper 220 may generate a local map associated with the current position of the OOI based on the localization information and the mapping information. For example, the local map may include local map information indicating the various static or stationary objects within the surroundings (or the vicinity) of the current position of the OOI.

In some embodiments, the pose analyzer 222 may identify one or more intrinsic properties (e.g., one or more pose attributes) of the OOI. The one or more intrinsic properties of the OOI may include, for example, a 3D pose of the OOI, an activity of the OOI, intention of the OOI, and/or the like. For example, in some embodiments, the pose analyzer 222 may estimate a 3D shape (e.g., a 3D pose outline or a 3D body outline) of the OOI from the 3D representation provided by the LIDAR 210. In some embodiments, the pose analyzer 222 may identify an activity of the OOI, for example, such as walking, running, skating, biking, talking on the phone, approaching towards the vehicle's anticipated trajectory, heading away from the vehicle's anticipated trajectory, requesting to stop the vehicle, and/or the like, based on the 2D representation provided by the camera 208. In some embodiments, the pose analyzer 222 may identify an intent of the OOI by analyzing various parameters (e.g., body parameters) of the OOI. For example, the one or more parameters may indicate an orientation of the OOI's head, a position of the OOI's face (e.g., where the OOI is looking), an orientation of the OOI's body (e.g., where the OOI is turning), and/or the like. In some embodiments, the pose analyzer 222 may regress a 3D pose of the OOI based on the body parameters of the OOI. The pose analyzer 222 will be described in more detail below with reference to FIGS. 3 and 4.

In some embodiments, the trajectory calculator 224 may calculate (e.g., predict or estimate) a trajectory (or a distractedness) of the OOI based on the historic temporal data generated by the temporal serializer 218, the local map generated by the environment mapper 220, and the one or more intrinsic properties (e.g., the one or more pose attributes) associated with the OOI identified by the pose analyzer 222. In various embodiments, for example, the trajectory calculator 224 may estimate the trajectory of a corresponding OOI based on a current position of the corresponding OOI, a current position of one or more other OOI's within a spatial proximity to the corresponding OOI, location of various objects (e.g., static objects) within a spatial proximity of the corresponding OOI, 3D pose of the corresponding OOI, current activity of the corresponding OOI, and/or intent of the corresponding OOI with respect to a trajectory path of the corresponding OOI. For example, if the OOI is a person, a pose of the person may indicate that the person is leaning forward and walking, such that the person is likely to continue along a forward trajectory. In another example, a pose of the person may indicate that the person is leaning forward and running, such that the person is likely to continue along a forward trajectory at a high rate of speed. In yet other examples, an activity and/or an intent of the person may indicate that the person is talking on the phone, looking around the person's surroundings or otherwise distracted, walking towards the vehicle 100, riding a bike, and/or the like, such that the person should be closely monitored (or tracked). The trajectory calculator 224 will be described in more detail below with reference to FIG. 5.

In some embodiments, the calculated trajectory of the OOI may be provided to the vehicle controller 206, such that the vehicle controller 206 may control the vehicle 100 to automatically maneuver along a suitable navigational path that is determined based on the estimated trajectory of one or more OOIs. In this case, the vehicle controller 206 (and/or the trajectory predictor 204) may calculate the suitable navigational path (e.g., or adjust a current navigational path) according to the estimated trajectory of the one or more OOIs using any suitable algorithm and/or control method as would be known to those skilled in the art.

Figure 3:
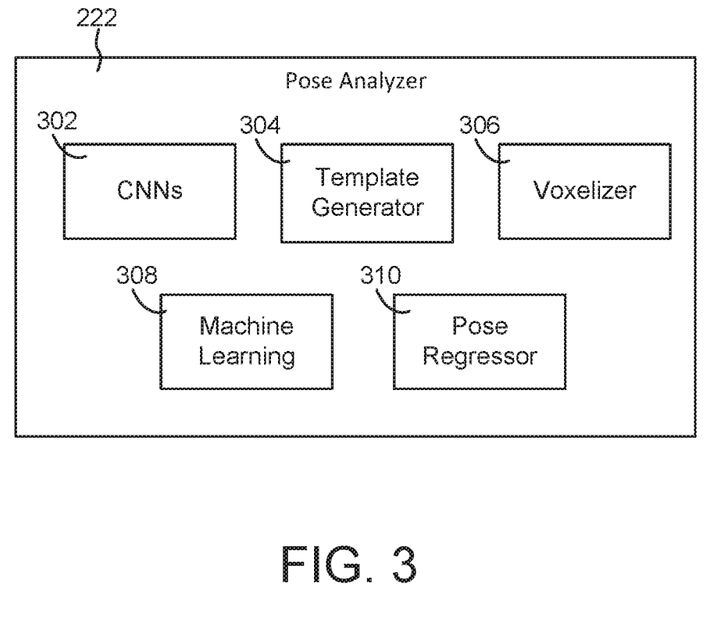
FIG. 3 is a block diagram illustrating a pose analyzer, according to an example embodiment.
Figure 4:
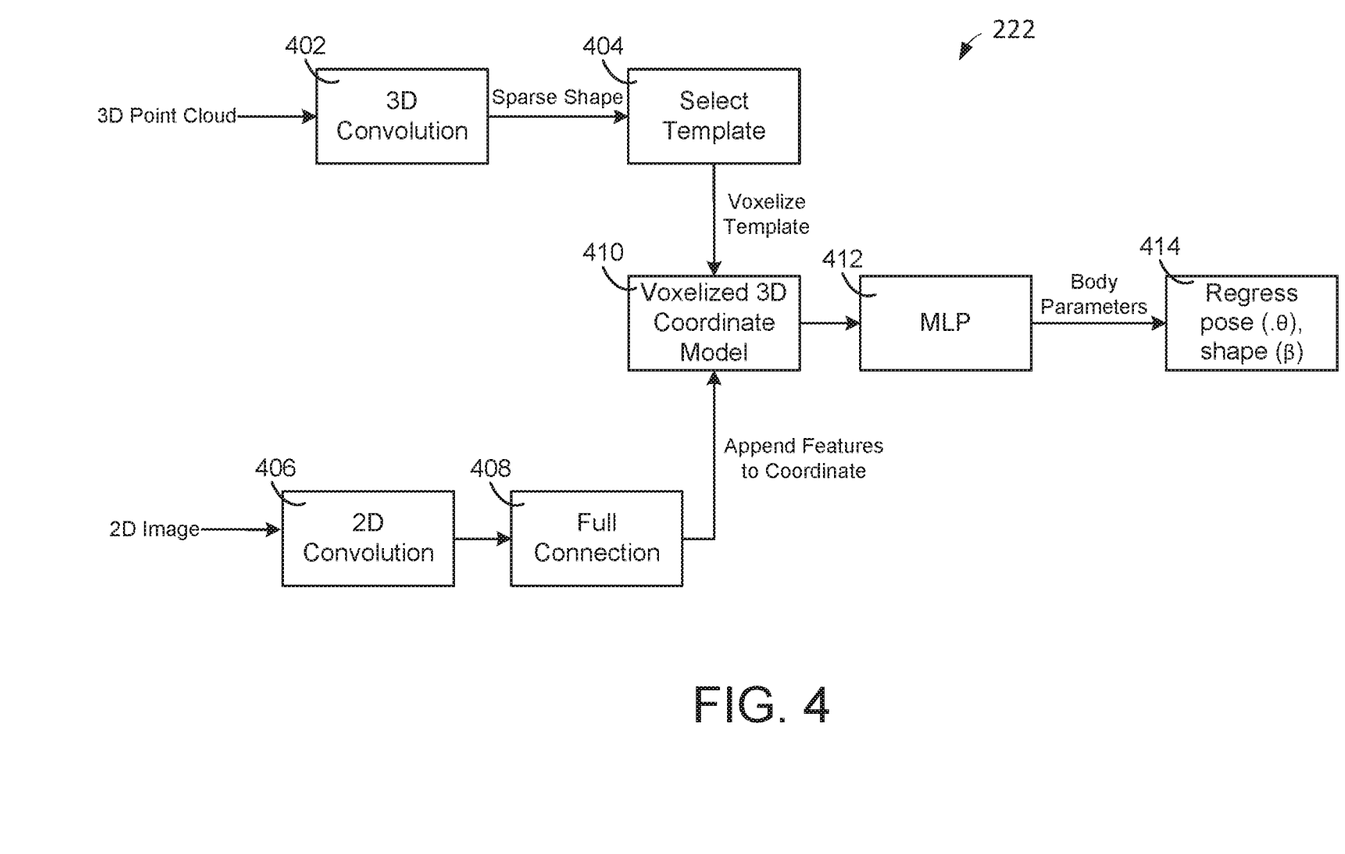
FIG. 4 is a flow diagram illustrating a method of the pose analyzer, according to an example embodiment.

FIG. 3 is a block diagram illustrating the pose analyzer in more detail, according to an example embodiment. FIG. 4 is a flow diagram illustrating a method of the pose analyzer for identifying one or more intrinsic properties associated with a person of interest (POI), according to an example embodiment. Hereinafter, for convenience of description, a pedestrian is provided as an example of the object such that the OOI may be interchangeably referred to as the POI, but the present disclosure is not limited thereto, and the object may be any suitable dynamic or moving object, for example, such as a pedestrian, an animal, another vehicle, a driver of another vehicle, a rider of a motorcycle, a rider of a bicycle, a person pushing a bicycle or standing next to a bicycle, and/or the like.

Referring to FIGS. 3 and 4, in some embodiments, the pose analyzer 222 may identify one or more intrinsic properties (e.g., one or more human pose attributes) of the POI, for example, such as a 3D pose of the POI, a current activity of the POI, an intention of the POI with respect to a trajectory path of the POI, and/or the like. For example, in some embodiments, the pose analyzer 222 may receive the sensory data from the one or more vehicle sensors 202, and may analyze the sensory data to determine a 3D pose of the POI from the sensory data. In some embodiments, the pose analyzer 222 may analyze the sensory data to identify an activity of the POI from the sensory data. In some embodiments, the pose analyzer 222 may determine (e.g., or learn using machine learning) from the 3D pose and/or the activity of the POI, one or more body parameters associated with the POI that may indicate an intention of the POI that potentially affects a trajectory of the POI. Accordingly, in various embodiments, trajectory prediction of the POI may be improved by using insights that are determined (or learned) from the one or more pose attributes of the POI, rather than simply estimating the trajectory based only on past positions of one or more POIs (e.g., estimating the trajectory based only on the historic temporal data of the one or more POIs).

In more detail, in some embodiments, the pose analyzer 222 may include one or more convolutional neural networks (CNNs) 302, a template generator 304, a voxelizer 306, a machine learning system (e.g., or a machine learning device, component, or module) 308, and a pose regressor 310. In some embodiments, the one or more CNNs 302 may analyze the sensory data to construct a 3D pose of the POI from the sensory data. For example, in some embodiments, the one or more CNNs 308 may include a first CNN to analyze the 3D representation data of the POI and a second CNN to analyze the 2D representation data of the POI.

In some embodiments, the first CNN may receive the 3D point cloud data provided by, for example, the LIDAR 210, and may output a sparse shape (e.g., or sparse shape data) corresponding to a 3D pose shape (or a 3D body shape) of the POI. For example, the first CNN may perform a 3D convolution 402 on the 3D point cloud data to output the sparse shape data. In some embodiments, the sparse shape output by the first CNN (e.g., the 3D convolution 402) may be provided to the template generator 304, and the template generator 304 may select (or identify) a suitable template (e.g., an outline, shape, and/or mesh) 404 associated with the POI from the sparse shape. The template is provided to the voxelizer 306 to voxelize the template such that a voxelized representation (e.g., a voxel model) of the POI is generated by the voxelizer 306. For example, the voxelized representation of the POI may represent a general 3D shape and/or 3D pose outline of the POI as a plurality of volumetric cubes, but may generally lack specific features of the POI (e.g., facial features, held objects, and/or the like).

In some embodiments, the second CNN of the one or more CNNs 302 may receive the 2D image provided by, for example, the camera 208. The 2D image may correspond in time with the 3D point cloud data, such that the 2D image and the 3D point cloud data correspond to (e.g., is captured at) the same or substantially the same time as each other. The 2D image may show various features of the POI in more detail that are not shown in the 3D point cloud data associated with the POI. In this case, in some embodiments, the second CNN may perform a 2D convolution 406 on the 2D image to identify the various features of the POI in the 2D image. The second CNN may then output the 2D convolution 406 to a full connection (e.g., one or more fully connected layers) 408 to classify the various features (e.g., classify an activity) of the POI shown in the 2D image. The identified features are appended to corresponding coordinates of the voxelized template (or the voxelized model), and a voxelized 3D coordinate model (or voxelized 3D coordinate template) 410 is provided to the machine learning system 308 to determine one or more body parameters of the POI. For example, the identified features may be appended to the voxelized template using any suitable skinning algorithm, for example, such as blended skinning, multi-matrix skinning, linear blend skinning, skeletal subspace deformation (SSD), and/or the like.

In some embodiments, the machine learning system 308 may use any suitable machine learning model or algorithm to determine the body parameters of the POI from the voxelized 3D coordinate model 410 of the POI. For example, in some embodiments, the machine learning device or system 308 may include one or more multilayer perceptrons (MLPs) 412 to learn the body parameters from the voxelized 3D coordinate model 410. However, the present disclosure is not limited thereto, and the machine learning device or system 308 may include any suitable machine learning or neural network learning architecture, for example, such as a CNN, a Recurrent Neural Network (RNN), Recursive Neural Network, Fully Connected Neural Network, and/or the like.

In some embodiments, the MLP 412 may analyze the voxelized template 3D coordinate 410, and may determine one or more body parameters of the POI. For example, in some embodiments, the MLP 412 may use any suitable model or algorithm to determine the one or more body parameters of the POI, for example, such as a skinned vertex-based model (e.g., A Skinned Multi-Person Linear Model (SMPL)) that uses corrective blend shapes, but the present disclosure is not limited thereto. For example, in some embodiments, a single blend shape associated with the POI may be represented as a vector of concatenated vertex offsets. Following general skinning practice, the model may be defined by a mean template shape (e.g., the voxelized model or template) represented by a vector of N concatenated vertices in a zero (e.g., or an initial) pose, a set of blend weights, a suitable blend shape function that takes an input of a vector of shape parameters β and outputs a blend shape of the POI, a suitable function to predict K joint locations as a function of the shape parameters β, and a suitable pose-dependent blend shape function that takes as input a vector of pose parameters θ to account for effects of pose-dependent deformations. A suitable blend skinning function may be used to rotate the vertices around the estimated joint centers with smoothing defined by the blend weights. Thus, the result is a model that maps shape β and pose θ parameters to the vertices. However, the present disclosure is not limited thereto, and any suitable algorithm or model may be used to identify one or more shape and pose dependent body parameters of the POI.

In some embodiments, the body parameters may include one or more of the pose parameters θ and one or more of the shape parameters β. For example, in some embodiments, the pose of a POI is defined by a skeletal rig (e.g., a standard skeletal rig) having an axis-angle representation of a relative rotation of a part (e.g., a body part) k with respect to its parent part in a kinematic tree. For example, if the skeletal rig includes 23 joint locations (e.g., K=23), then there may be 72 pose parameters θ (e.g., 3×23+3) corresponding to 3 for each part plus 3 for a root orientation. The one or more shape parameters β define the parameters (e.g., character parameters) of a given body shape (e.g., a shape or outline of the POI). For example, a given body shape is parameterized into the shape parameters β by the vertices of a rest pose, corrective blend shapes (e.g., at key angles), and bone lengths. Thus, the shape parameters β define a number of linear shape coefficients of a linear function that defines the body shapes of different people learned by training (e.g., by training templates or training meshes).

In some embodiments, the pose θ and shape β parameters may be provided to the regressor 310 to regress the 3D pose of the POI by mapping the shape β and pose θ parameters to the vertices of the skeletal rig using a suitable optimization function. For example, once a model template, a set of blend weights, a matrix of shape displacements, joint locations, and a matrix of pose blend shapes are learned and fixed, the body shape and poses of the POI may be determined by varying the pose θ and shape β parameters for the POI to generate the 3D pose of the POI. Accordingly, a 3D pose of the POI that retains various features of the POI while realistically modeling dynamic soft-tissue deformations may be estimated (e.g., generated) from the sensory data.

Figure 5:
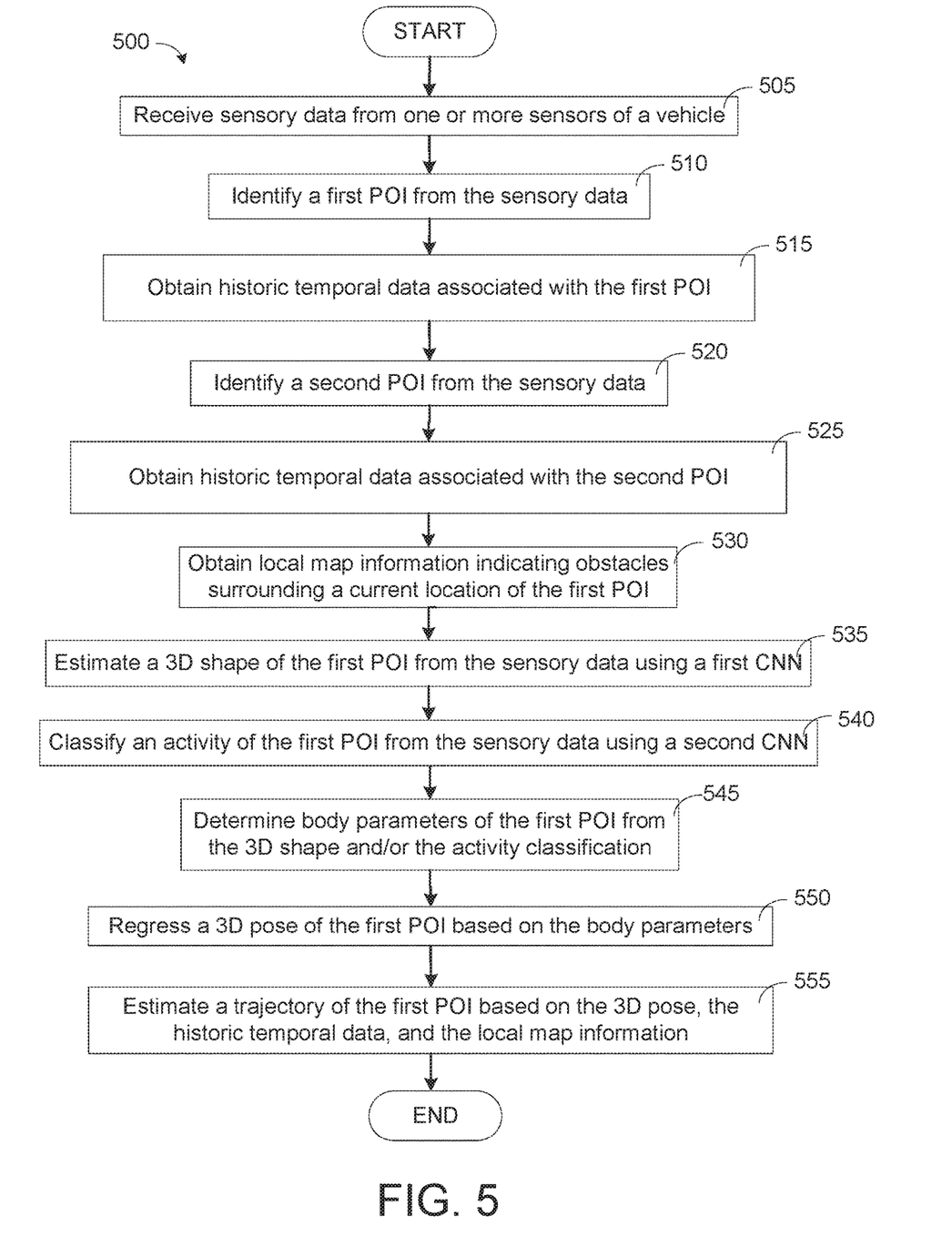
FIG. 5 is a flow diagram illustrating a method of estimating the trajectory of a person of interest, according to an example embodiment.

FIG. 5 is a flow diagram illustrating a method of estimating the trajectory of a person of interest, according to an example embodiment. However, the present disclosure is not limited to the sequence or number of the operations of the method shown in FIG. 5, and can be altered into any desired sequence or number of operations as recognized by a person having ordinary skill in the art. For example, in some embodiments, the order may vary, or the method may include fewer or additional operations.

Referring to FIG. 5, the method 500 starts and sensory data is received from one or more sensors of a vehicle at operation 505. For example, in some embodiments, the trajectory predictor 204 may receive a 2D representation (e.g., a 2D image) of a scene from a first sensor (e.g., the camera 208), and may further receive a 3D representation (e.g., a 3D point cloud) of the same or substantially the same scene from a second sensor (e.g., the LIDAR 210). The scene may include one or more objects (e.g., static objects and/or dynamic objects) that are within a suitable (e.g., predetermined) range of the vehicle 100 (e.g., and/or the vehicle sensors 202).

In some embodiments, a first POI is detected from the sensory data at operation 510. For example, in some embodiments, the temporal serializer 218 (and/or the pose analyzer 222) may detect the first POI from the scene using any suitable machine vision architecture and/or algorithm as would be known to those skilled in the art. For example, in some embodiments, the temporal serializer 218 (and/or the pose analyzer 222) may perform a convolution (e.g., a 2D convolution or a 3D convolution) on the sensory data (e.g., on the 2D image data and/or the 3D point cloud data) to identify various features within the scene that correspond to features of a person (or other desired object).

In some embodiments, the temporal serializer 218 may obtain historic temporal data associated with the first POI at operation 515. For example, in some embodiments, the temporal serializer 218 may track the first POI in real-time or near real-time using the sensors, and may generate a timeseries (e.g., a time-stamped series) corresponding to a plurality of time-correlated data points each indicating a location (or position) of the first POI at any given time. In some embodiments, the historic temporal data associated with the first POI may be used to determine, for example, a current location of the first POI, a heading direction of the first POI, and/or a speed of the first POI.

In some embodiments, one or more second POIs (hereinafter referred to simply as the second POI) 520 may be identified from the sensory data at operation 520. For example, in some embodiments, the temporal serializer 218 (and/or the pose analyzer 222) may analyze the scene or other sensory data to determine whether one or more other persons are within a desired (or a predetermined) spatial proximity (e.g., within a number of feet or a number of meters) of the first POI. In another example, the temporal serializer 218 (and/or the pose analyzer 222) may analyze the scene or the other sensory data to determine whether one or more other persons are approaching or crossing the desired (or the predetermined) spatial proximity of the first POI and/or within a spatial proximity of a potential path of the first POI.

In some embodiments, if the second POI is detected, the temporal serializer 218 may obtain historic temporal data associated with the second POI at operation 525. For example, in some embodiments, the temporal serializer 218 may track the second POI in real-time or near real-time using the sensors, and may generate historic temporal data associated with the second POI. In some embodiments, the historic temporal data associated with the second POI may be used to determine whether the second POI may potentially alter or affect the potential trajectory of the first POI. For example, in some embodiment, the historic temporal data associated with the second POI may indicate, for example, a current location of the second POI relative to that of the first POI, a heading direction of the second POI relative to that of the first POI, and/or a speed of the second POI relative to that of the first POI.

In some embodiments, local map information indicating obstacles (or objects) surrounding a current location of the first POI is obtained at operation 530. For example, in some embodiments, the environment mapper 220 may generate the local map information based on mapping information and localization information associated with the current position of the OOI. In this case, the local map information may indicate various static or stationary objects (e.g., stationary obstacles) within the surroundings of (e.g., within a spatial proximity to) the current position of the OOI and/or within one or more potential trajectory paths of the OOI.

In some embodiments, a 3D shape (e.g., or a 3D pose shape) of the first POI is estimated from the sensory data using a first CNN at operation 535. For example, in some embodiments, the pose analyzer 222 may perform a 3D convolution on the 3D point cloud data provided by the LIDAR 210. In some embodiments, the pose analyzer 222 may voxelize a sparse shape corresponding to the first POI to generate a voxelized model corresponding to the 3D shape of the first POI.

In some embodiments, an activity of the first POI is classified from the sensory data using a second CNN at operation 540. For example, in some embodiments, the pose analyzer 222 may perform a 2D convolution on the 2D image data provided by the camera 208. In some embodiments, the pose analyzer 222 may fully connect the output of the 2D convolution to classify various features (e.g., body appendage positions and/or orientations) of the first POI, and may determine an activity of the first POI based on the classifications (e.g., walking, running, skating, biking, speaking, talking on the phone, and/or the like).

In some embodiments, one or more body parameters of the first POI is determined from the 3D shape and/or the activity classification at operation 545. For example, in some embodiments, the pose analyzer 222 may append the features of the first POI from the 2D image data to corresponding coordinates of the voxelized model corresponding to the 3D point cloud data to generate the voxelized 3D coordinate model (or the voxelized 3D coordinate template) 410. The voxelized 3D coordinate model may be processed by the MLP 412 to learn the pose parameters $\theta$ and the shape parameters $\beta$. The body parameters (e.g., the pose parameters $\theta$ and the shape parameters $\beta$) are then regressed to generate the 3D pose of the first POI at operation 550.

In some embodiments, the trajectory of the first POI is estimated based on the 3D pose, the historic temporal data, and the local map information at operation 555. For example, in some embodiments, the trajectory calculator 224 may calculate the trajectory of the POI using any suitable algorithm (e.g., a linear function, a non-linear function, and/or convolution function) that considers (e.g., combines or fuses) the historical temporal data generated by the temporal serializer 218, the local map information generated by the environment mapper 220, and the 3D pose generated by the pose analyzer 222. For example, the trajectory calculator 224 may combine (e.g., fuse) the various information using one or more of any suitable model, framework, or process, such as a long short-term memory network (LSTM) model, a pedestrian motion model (e.g., a social force model), continuum dynamics, a Discrete Choice framework, Gaussian processes, agent-based models, activity forecasting models, and/or the like that combines (e.g., fuses) the insights learned from the 3D pose, the historic temporal data, and the local map information. For example, in some embodiments, the trajectory calculator 224 may concatenate the pose attributes learned from the 3D pose estimation (e.g., which may be a representation by embedding and/or using a CNN or the like) of the POI, information associated with a current trajectory of the POI from the historic temporal data, and feature representations from the map information, and/or the like, to calculate the trajectory of the POI.

In more detail, for example, in some embodiments, the trajectory calculator 224 may determine a current position, a heading direction, and/or a speed of the first POI from the historic temporal data associated with the first POI. In some embodiments, the trajectory calculator 224 may determine potential objects or obstacles surrounding the current location of the first POI from the local map information associated with the first POI. In some embodiments, the trajectory calculator 224 may identify one or more second POIs that are within a threshold spatial proximity (e.g., a number of feet and/or a number of meters) to the current location of the first POI and/or a potential trajectory path of the first POI. In some embodiments, the trajectory calculator 224 may determine a current position, a heading direction, and/or a speed of the one or more second POIs relative to those of the first POI from the historic temporal data associated with the one or more second POIs. For example, in some embodiments, the trajectory calculator 224 may determine whether the one or more second POIs are likely to affect a potential trajectory of the first POI according to the current location, the heading direction, and/or the speed of the one or more second POIs relative to those of the first POI and/or relative to one or more potential trajectory paths of the first POI.

In some embodiments, the trajectory calculator 224 may determine a plurality of potential trajectory paths that are available to the first POI based on the current position, heading direction, and/or speed of the first POI, the obstacles (or objects) surrounding the current location of the first POI or within (e.g., blocking) one or more of the plurality of potential trajectory paths, and the one or more second POIs and their current location, heading direction, and/or speed relative to the current location of the first POI and/or relative to one or more of the plurality of potential trajectory paths of the first POI. For example, as the first POI is approaching an obstacle along a current trajectory path, different potential trajectory paths may be presented to avoid colliding with the obstacle, for example, such as moving towards the right or moving towards the left. Similarly, as the first POI is approaching a second POI on their respective current trajectory paths, several potential trajectory paths may be presented to avoid colliding with the second POI, for example, such as slowing down to allow the second POI to pass in front of the first POI, speeding up to allow the second POI to pass behind the first POI, switching directions to avoid colliding with the second POI, and/or the like. Accordingly, in some embodiments, the trajectory calculator 224 may use the historic temporal data and/or the local map information to determine a plurality of possible trajectory paths that the first POI make take in order to avoid colliding with various static and/or dynamic obstacles.

However, as illustrated in the examples above, when predicting a trajectory path of the first POI based only on the historic temporal data, numerous different potential (or plausible) path scenarios may be presented, especially when the obstacle to avoid is another dynamic obstacle, such as the second POI. In this case, considering only the historic temporal data of the first and second POIs may be insufficient, especially considering that pedestrians in particular generally comply with a number of social conventions and common-sense rules when deciding which path to take. Accordingly, while related-art models may provide some "plausible" trajectory paths based on learned person-specific motion properties (e.g., person-specific historic temporal data) from a limited set of observations corresponding to the person, these models may fail to consider the intrinsic properties of the person, such as the 3D pose, the activity, and/or the intent of the person, and thus, may be prone to errors.

According to one or more example embodiments, the trajectory calculator 224 further considers the 3D pose of the first POI to determine (e.g., select or predict) a likely trajectory path of the first POI from among the plurality of possible trajectory paths. For example, in some embodiments, the trajectory calculator 224 may determine from the 3D pose (e.g., and/or the body parameters) of the first POI, a position of the first POI's head, an orientation of the first POIs face, spacing between the first POI's legs, position of the first POI's hands, orientation of the first POI's body, and/or the like. In this case, the trajectory calculator 224 may determine from the various orientations and positions shown in the 3D pose (e.g., and/or the body parameters) of the first POI, an activity of the first POI and/or an intent of the first POI that may be used to determine (e.g., to select) a suitable (or an appropriate) one of the plurality of possible trajectory paths as the predicted trajectory path for the first POI. For example, in various embodiments, the trajectory calculator 224 may determine from the orientation of the first POI's hands, whether the first POI is talking on the phone (e.g., if the first POI's hands are covering the first POI's ears or holding an object close to the first POI's mouth), running or slowing down (e.g., based on the spacing between the first POI's legs), looking at the second POI or looking away from the second POI (e.g., based on the orientation of the first POI's face), waving at the second POI to pass in front (e.g., based on the position of the first POI's arms), changing directions (e.g., based on the orientation of the first POI's body), and/or the like.

In some embodiments, the trajectory calculator 224 may determine (e.g., estimate or predict) a potential effect of the identified activity and/or intent of the first POI on the trajectory of the first POI. For example, in some embodiments, the trajectory calculator 224 may determine that the first POI is likely to stop (or slow down) for the second POI if the first POI is looking at the second POI (e.g., based on the orientation of the first POI's head) and/or is waving at the second POI to pass by (e.g., based on the position of the first POI's arms). On the other hand, in another example, the trajectory calculator 224 may determine that the first POI is not likely to alter his/her trajectory path for the second POI if the first POI is jogging (e.g., based on the spacing between the first POI's legs) and/or not looking at the second POI (e.g., based on the orientation of the first POI's face). In some embodiments, the trajectory calculator 224 may determine (e.g., or predict) how the potential effect of the identified activity and/or intent of the first POI is likely to alter the current trajectory of the first POI in order to determine (or select) the suitable trajectory path from among the plurality of possible trajectory paths of the first POI. Accordingly, trajectory prediction for dynamic obstacles, such as pedestrians, may be improved according to the insights learned from the 3D pose of the pedestrians. However, embodiments according to the present disclosure are not limited thereto, and while various examples of using the 3D pose to identify an intent and/or activity of the first POI is provided, these are non-limiting examples, and the insights learned from the 3D pose of the first POI may be used in any suitable manner in order to determine or select the likely or suitable trajectory path at operation 555.

Figure 6:
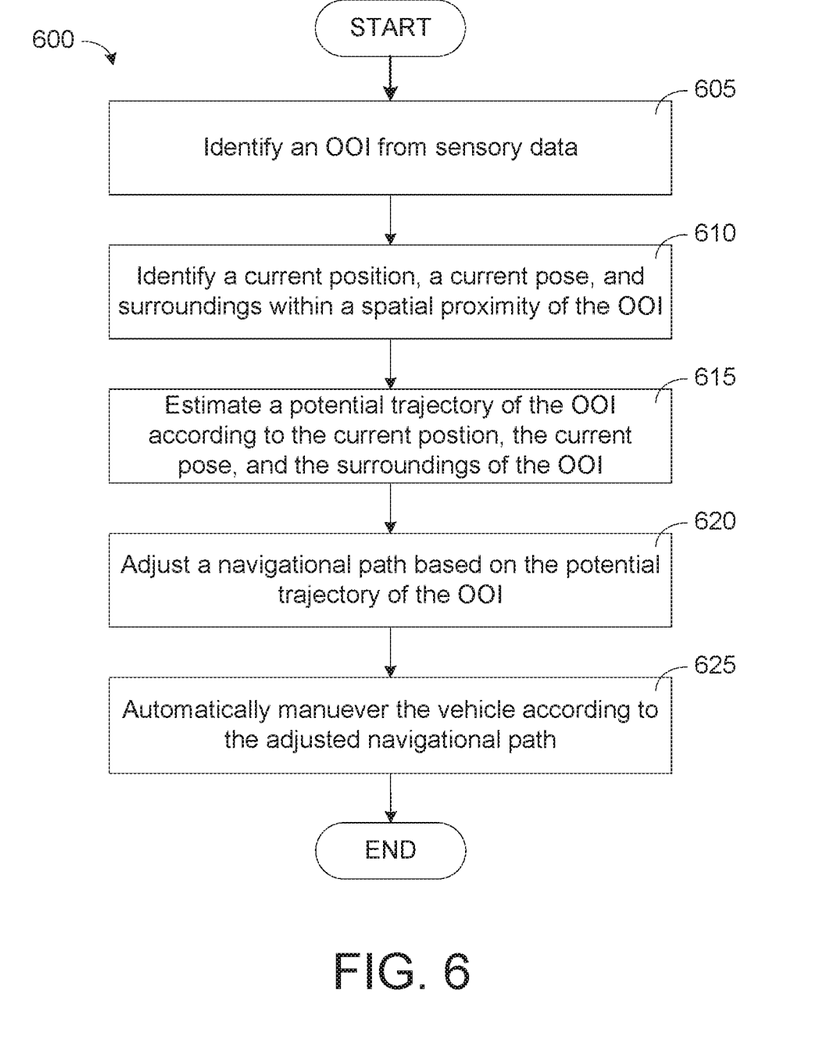
FIG. 6 is a flow diagram illustrating a method of controlling an autonomous vehicle based on a predicted trajectory of a person of interest, according to an example embodiment.

FIG. 6 is a flow diagram illustrating a method of controlling an autonomous vehicle based on a predicted trajectory of a pedestrian, according to an example embodiment. However, the present disclosure is not limited to the sequence or number of the operations of the method shown in FIG. 6, and can be altered into any desired sequence or number of operations as recognized by a person having ordinary skill in the art. For example, in some embodiments, the order may vary, or the method may include fewer or additional operations.

Referring to FIG. 6, the method 600 starts and an OOI is identified from the sensory data at operation 605. For example, the OOI may be identified from a 2D representation of the OOI and/or a 3D representation of the OOI that is generated (e.g., captured) by the sensors 202. In some embodiments, a current position, a current pose, and surroundings within a spatial proximity of the current position of the OOI is identified at operation 610. For example, the current position (e.g., the current location) of the OOI may be identified from the historic temporal data associated with the OOI generated by the temporal serializer 218 as discussed above. The current pose of the OOI may be identified from the estimated 3D pose generated by the pose analyzer 222 as discussed above. The surroundings within the spatial proximity of the current location of the OOI may be identified by the environment mapper 220 as discussed above.

In some embodiments, a potential trajectory of the OOI is estimated according to the current position, the current pose, and the surroundings of the OOI at operation 615. For example, the potential trajectory of the OOI may be estimated by the trajectory calculator 224 by combining (e.g., fusing) various information associated with (or learned from) the current position, the current pose, and the surroundings as discussed above. In some embodiments, a navigational path of the vehicle is adjusted based on the potential trajectory of the OOI at operation 620. For example, in some embodiments, the vehicle controller 206 (or the trajectory predictor 204) may adjust a current navigational path of the vehicle based on the estimated (or predicted) trajectory of the OOI, such that the vehicle avoids colliding with the OOI along its navigational path. In some embodiments, the vehicle is controlled to automatically maneuver the vehicle according to the adjusted navigational path at operation 625, and the process ends. For example, the vehicle controller 206 may include any suitable controllers, drivers, motors, actuators, circuits, processors, and/or the like to automatically control the movement of the vehicle 100 along the adjusted navigational path.

Various example embodiments of the present disclosure have been described herein with reference to the accompanying drawings. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

While various example embodiments of systems and methods for trajectory prediction for autonomous vehicles have been specifically described and illustrated herein, many modifications and variations will be apparent to those skilled in the art. Accordingly, it is to be understood that systems and methods for trajectory prediction for autonomous vehicles constructed according to principles of this disclosure may be embodied other than as specifically described herein. The disclosure is also defined in the following claims, and equivalents thereof.

What is claimed is:

1. An object trajectory prediction system of a vehicle comprising:
   one or more sensors configured to generate sensory data corresponding to one or more objects within a range of the vehicle;
   one or more processors; and
   memory coupled to the one or more processors and having instructions that, when executed by the one or more processors, cause the one or more processors to:
      identify a first person of interest (POI) from the sensory data;
      estimate a 3-dimensional (3D) pose of the first POI from the sensory data;
      calculate a trajectory of the first POI according to at least the 3D pose of the first POI; and
      determine a navigational path of the vehicle according to the trajectory of the first POI,
   wherein the one or more sensors comprises:
      one or more cameras to generate 2-dimensional (2D) image data associated with the first POI; and
      one or more LIDARs to generate 3D point cloud data associated with the first POI, and
   wherein to estimate the 3D pose of the first POI, the instructions further cause the one or more processors to:
      perform a 3D convolution on the 3D point cloud data to generate a sparse shape corresponding to the first POI;
      generate a voxelized model according to the sparse shape;
      perform a 2D convolution on the 2D image data to identify one or more features of the first POI;
      append the one or more features of the first POI to coordinates of the voxelized model to generate a voxelized 3D coordinate model;
      identify one or more body parameters of the first POI according to the voxelized 3D coordinate model; and
      regress the body parameters to determine the 3D pose of the first POI.

2. The system of claim 1, wherein to calculate the trajectory of the first POI, the instructions further cause the one or more processors to:
identify an activity of the first POI according to the identified features of the first POI; and
determine a potential effect of the activity on the trajectory of the first POI.

3. An object trajectory prediction system of a vehicle comprising:
one or more sensors configured to generate sensory data corresponding to one or more objects within a range of the vehicle;
one or more processors; and
memory coupled to the one or more processors and having instructions that, when executed by the one or more processors, cause the one or more processors to:
identify a first person of interest (POI) from the sensory data;
estimate a 3-dimensional (3D) pose of the first POI from the sensory data;
calculate a trajectory of the first POI according to at least the 3D pose of the first POI; and
determine a navigational path of the vehicle according to the trajectory of the first POI,
wherein the instructions further cause the one or more processors to:
generate historic temporal data associated with the first POI, the historic temporal data comprising time-correlated position information corresponding to a current location of the first POI; and
generate a local map corresponding to obstacles surrounding the current location of the first POI.

4. The system of claim 3, wherein to calculate the trajectory of the first POI, the instructions further cause the one or more processors to:
determine the current location and a heading direction of the first POI from the historic temporal data;
identify one or more obstacles within a spatial proximity relative to the current location and along the heading direction; and
identify one or more potential paths of the first POI according to the current location of the first POI, the heading direction of the first POI, and the one or more obstacles.

5. The system of claim 4, wherein to calculate the trajectory of the first POI, the instructions further cause the one or more processors to:
identify an orientation of the first POI's face according to the 3D pose of the first POI; and
select a trajectory path from among the one or more potential paths according to the orientation of the first POI's face.

6. The system of claim 3, wherein the instructions further cause the one or more processors to:
identify a second POI from the sensory data, the second POI being within a spatial proximity relative to the first POI; and
generate historic temporal data associated with the second POI, the historic temporal data associated with the second POI comprising time-correlated position information corresponding to a current location of the second POI.

7. The system of claim 6, wherein to calculate the trajectory of the first POI, the instructions further cause the one or more processors to:
determine the current location and a heading direction of the first POI from the historic temporal data associated with the first POI;
determine the current location and a heading direction of the second POI from the historic temporal data associated with the second POI; and
identify one or more potential paths of the first POI according to the current location of the first POI, the heading direction of the first POI, the current location of the second POI, and the heading direction of the second POI.

8. The system of claim 7, wherein to calculate the trajectory of the first POI, the instructions further cause the one or more processors to:
identify an intent to adjust a current trajectory of the first POI relative to the current location and/or the current heading direction of the second POI according to the 3D pose of the first POI; and
select a trajectory path from among the one or more potential paths according to the intent.

9. A method for predicting the trajectory of an object, the method comprising:
receiving, by one or more processors, sensory data from one or more sensors associated with a vehicle, the sensory data corresponding to one or more objects within a range of the vehicle;
identifying, by the one or more processors, a first person of interest (POI) from the sensory data;
estimating, by the one or more processors, a 3-dimensional (3D) pose of the first POI from the sensory data;
calculating, by the one or more processors, a trajectory of the first POI according to at least the 3D pose of the first POI; and
determining, by the one or more processors, a navigational path of the vehicle according to the trajectory of the first POI,
wherein the one or more sensors comprises:
one or more cameras to generate 2-dimensional (2D) image data associated with the first POI; and
one or more LIDARs to generate 3D point cloud data associated with the first POI, and
wherein the estimating of the 3D pose of the first POI comprises:
performing, by the one or more processors using a first convolutional neural network (CNN), a 3D convolution on the 3D point cloud data to generate a sparse shape corresponding to the first POI;
generating, by the one or more processors, a voxelized model according to the sparse shape;
performing, by the one or more processors using a second CNN, a 2D convolution on the 2D image data to identify one or more features of the first POI;
appending, by the one or more processors, the one or more features of the first POI to coordinates of the voxelized model to generate a voxelized 3D coordinate model;
identifying, by the one or more processors, one or more body parameters of the first POI according to the voxelixed 3D coordinate model; and
regressing, by the one or more processors, the body parameters to determine the 3D pose of the first POI.

10. The method of claim 9, wherein the calculating of the trajectory of the first POI comprises:
identifying, by the one or more processors, an activity of the first POI according to the identified features of the first POI; and determining, by the one or more processors, a potential effect of the activity on the trajectory of the first POI.

11. A method for predicting the trajectory of an object, the method comprising:
receiving, by one or more processors, sensory data from one or more sensors associated with a vehicle, the sensory data corresponding to one or more objects within a range of the vehicle;
identifying, by the one or more processors, a first person of interest (POI) from the sensory data;
estimating, by the one or more processors, a 3-dimensional (3D) pose of the first POI from the sensory data;
calculating, by the one or more processors, a trajectory of the first POI according to at least the 3D pose of the first POI; and
determining, by the one or more processors, a navigational path of the vehicle according to the trajectory of the first POI,
wherein the method further comprises:
generating, by the one or more processors, historic temporal data associated with the first POI, the historic temporal data comprising time-correlated position information corresponding to a current location of the first POI; and
generating, by the one or more processors, a local map corresponding to obstacles surrounding the current location of the first POI.

12. The method of claim 11, wherein the calculating of the trajectory of the first POI comprises:
determining, by the one or more processors, the current location and a heading direction of the first POI from the historic temporal data;
identifying, by the one or more processors, one or more obstacles within a spatial proximity relative to the current location and along the heading direction; and
identifying, by the one or more processors, one or more potential paths of the first POI according to the current location of the first POI, the heading direction of the first POI, and the one or more obstacles.

13. The method of claim 12, wherein the calculating of the trajectory of the first POI comprises:
identifying, by the one or more processors, an orientation of the first POI's face according to the 3D pose of the first POI; and
selecting, by the one or more processors, a trajectory path from among the one or more potential paths according to the orientation of the first POI's face.

14. The method of claim 11, further comprising:
identifying, by the one or more processors, a second POI from the sensory data, the second POI being within a spatial proximity relative to the first POI; and
generating, by the one or more processors, historic temporal data associated with the second POI, the historic temporal data associated with the second POI comprising time-correlated position information corresponding to a current location of the second POI,
wherein the calculating of the trajectory of the first POI comprises:
determining, by the one or more processors, the current location and a heading direction of the first POI from the historic temporal data associated with the first POI;
determining, by the one or more processors, the current location and a heading direction of the second POI from the historic temporal data associated with the second POI; and
identifying, by the one or more processors, one or more potential paths of the first POI according to the current location of the first POI, the heading direction of the first POI, the current location of the second POI, and the heading direction of the second POI.

15. The method of claim 14, wherein the calculating of the trajectory of the first POI comprises:
identifying, by the one or more processors, an intent to adjust a current trajectory of the first POI relative to the current location and/or the current heading direction of the second POI according to the 3D pose of the first POI; and
selecting, by the one or more processors, a trajectory path from among the one or more potential paths according to the intent.

16. A computer-readable storage medium storing instructions thereon that, when executed by a processor, cause the processor to perform a method comprising:
identifying a first person of interest (POI) from sensory data;
estimating a 3-dimensional (3D) pose of the first POI from the sensory data;
calculating a trajectory of the first POI according to at least the 3D pose of the first POI; and
determining a navigational path of a vehicle according to the trajectory of the first POI,
wherein the instructions further cause the processor to perform the method comprising:
generating historic temporal data associated with the first POI, the historic temporal data comprising time-correlated position information corresponding to a current location of the first POI; and
generating a local map corresponding to obstacles surrounding the current location of the first POI.

* * * * *